Figure 1:
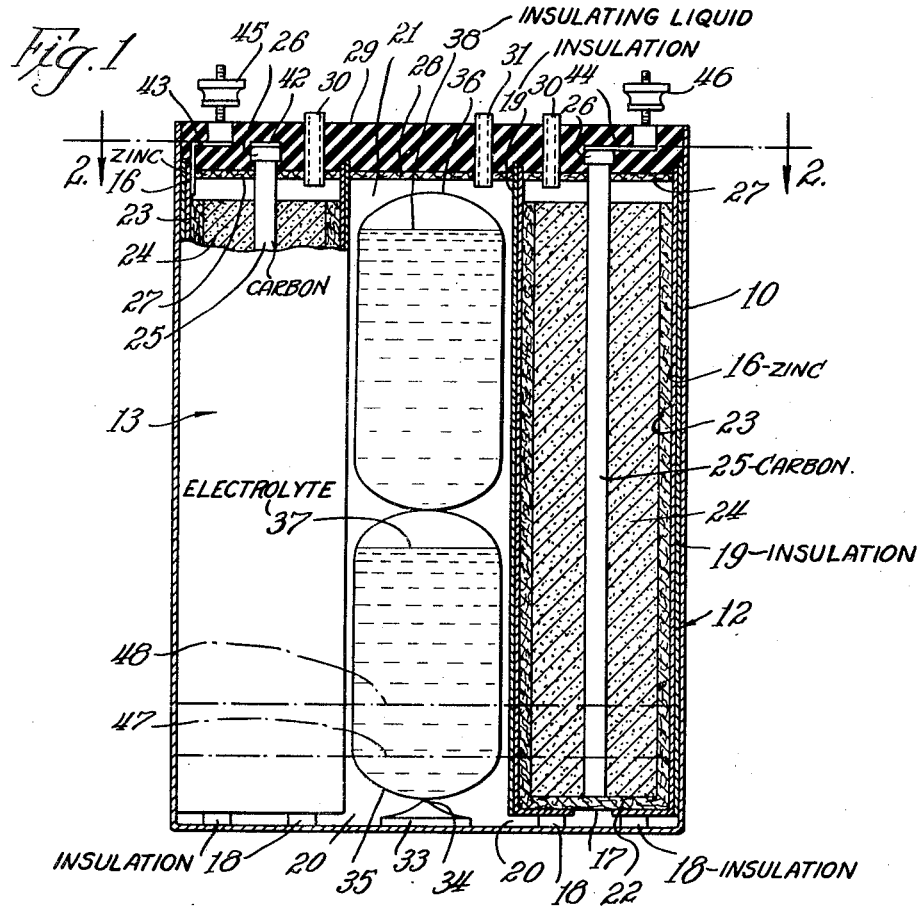

April 4, 1950 L. H. HARRISS 2,502,723
DEFERRED-ACTION DRY BATTERY
Filed Sept. 20, 1944 3 Sheets-Sheet 1

INVENTOR.
Lawrence H. Harriss
BY
Lesch and Darbo
Att'ys.

April 4, 1950     L. H. HARRISS     2,502,723
DEFERRED-ACTION DRY BATTERY
Filed Sept. 20, 1944     3 Sheets-Sheet 2
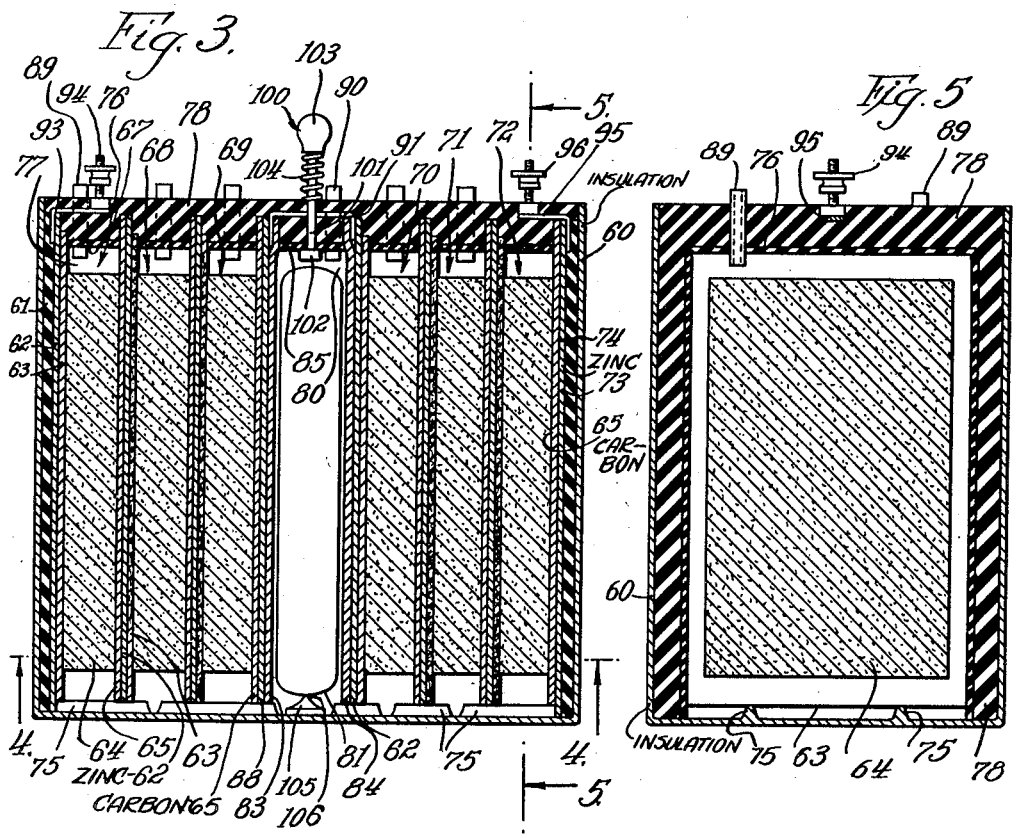
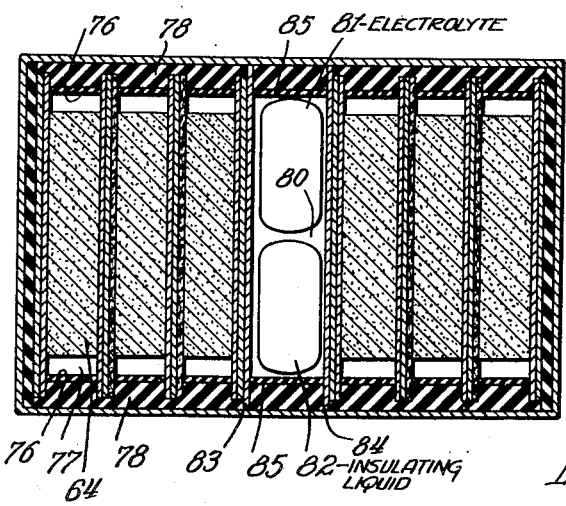
INVENTOR.
Lawrence H. Harriss
BY
Jesch and Darbo
att'ys.

April 4, 1950 — L. H. HARRISS — 2,502,723
DEFERRED-ACTION DRY BATTERY
Filed Sept. 20, 1944 — 3 Sheets-Sheet 3
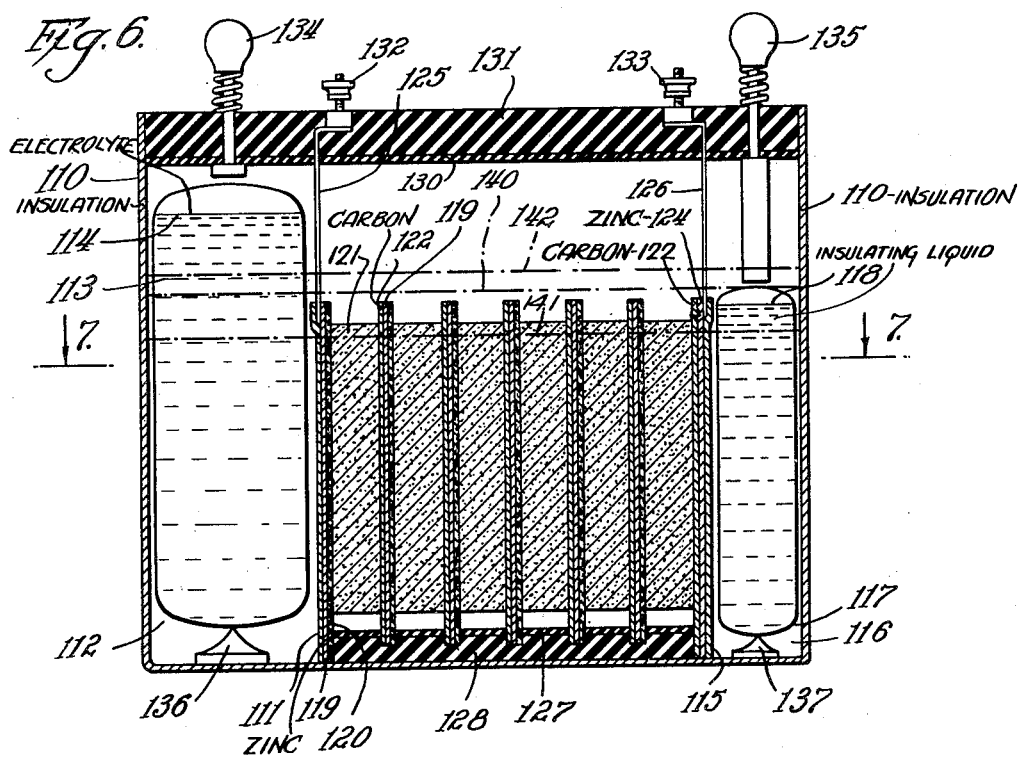
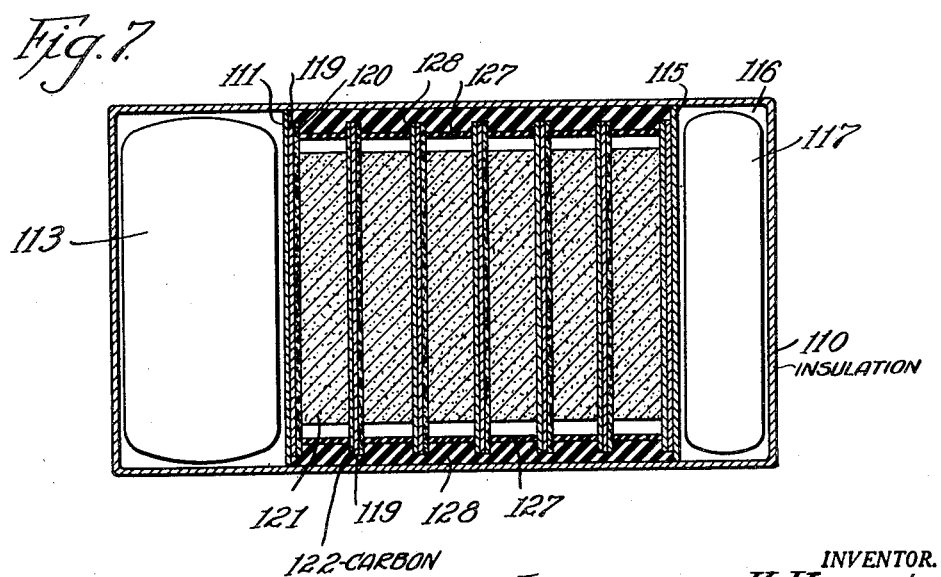
INVENTOR.
Lawrence H. Harriss
BY Jesch and Darby
Att'ys.

Patented Apr. 4, 1950

2,502,723

UNITED STATES PATENT OFFICE 2,502,723

DEFERRED-ACTION DRY BATTERY

Lawrence H. Harriss, Elgin, Ill., assignor, by mesne assignments, to Burgess Battery Company, Freeport, Ill., a corporation of Delaware Application September 20, 1944, Serial No. 554,911

9 Claims. (Cl. 136—113)

This invention relates to a dry battery and particularly a deferred action battery, by which is meant a battery in which the electrolyte or activating agent is maintained out of its normal activating relationship with the cooperating elements until it is desired to place the battery in use. The advantage of such a deferred action battery is that it remains entirely inactive and, therefore, does not deteriorate during storage. The battery of the present invention may be used to operate an emergency light or signal, as for trucks, automobiles, boats, etc., where long periods of time may pass before the signal is required. The deferred action battery of the present invention has the advantage for such service that regardless of the length of time which may elapse before the emergency arises, the battery will deliver full electrical energy.

It is the object of the present invention to provide a deferred action battery which undergoes substantially no deterioration during storage, and is readily rendered active by a simple operation, and thereupon delivers its full energy.

Briefly, the invention consists in providing a battery composed of a plurality of cells each comprising an anode and a cathode and an electrolyte space between the anode and cathode, the electrolyte space being in communication with the space outside of the cells. To accomplish this, the cells are exposed to each other. Separate quantities of activating liquid and of a second liquid are confined in the space outside of the cells, the second liquid being non-conductive, substantially immiscible with the activating liquid and having a specific gravity different from that of the activating liquid. Means are provided for releasing the activating liquid when it is desired to place the battery in use, whereby such liquid will be distributed to the electrolyte spaces of the cells. Means are also provided for releasing the second liquid after a suitable interval of time. The arrangement of the cells within the container is such that the non-conductive liquid displaces the activating liquid in the portion of the container where the cells are exposed to each other, whereby the non-conductive liquid serves to insulate the cells from each other.

Figure 2:
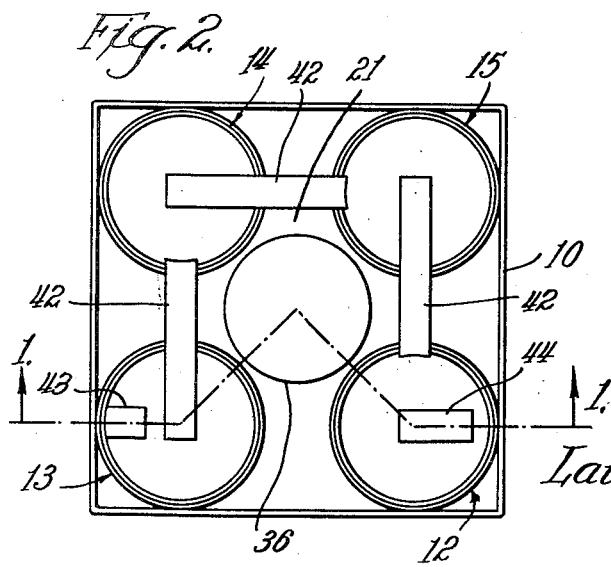

In the drawings:

Fig. 1 is a sectional elevational view of the battery of the present invention, taken along line 1—1 of Fig. 2 with one of the cells shown in section and another partly in section;

Fig. 2 is a sectional plan view taken along line 2—2 of Fig. 1 with parts 27, 28, 29, 30 and 31 removed for clearness;

Fig. 3 is a sectional elevational view of a different modification of the battery of the present invention;

Figs. 4 and 5 are sectional views along lines 4—4 and 5—5 of Fig. 3, respectively;

Fig. 6 is a sectional elevational view of a further modification of the invention; and Fig. 7 is a sectional view along line 7—7 of Fig. 6.

Referring to Figs. 1 and 2, the battery of the present invention comprises an open-top container 10 of electrolyte resisting material, such as brass, paraffin-impregnated paperboard, synthetic resin, such as the well known phenolformaldehyde condensation product, etc. Within the container 10 are arranged a plurality of dry cells, 12, 13, 14 and 15. It is understood that any desired number of cells may be used, and that four cells are illustrated for convenience. The cells are of similar construction and each (see Fig. 1) comprises a zinc electrode 16 which is in the form of a cylindrical cup which is open at the top and has an opening 17 in the bottom thereof. Suitably spaced apart supporting members 18 are provided upon the bottom of the container 10 and serve to hold the zinc cups 16 in spaced relation to the said bottom. If container 10 is composed of conductive material, supports 18 should be of non-conductive material. The cells 12, 13, 14 and 15 are spaced apart in such manner as to form a central space 21.

Each of the cells is encircled by a cylindrical envelope 19 which is open at both ends and at the lower end is spaced from the bottom of the container 10, as indicated at 20. The envelope 19 is composed of a non-conductive electrolyte resisting material, such as paraffin-impregnated paper, "Pliofilm," etc.

Within each cell, a layer of bibulous non-conductive material 22 is arranged upon the bottom of the zinc cup 16 and a second layer 23 of similar material lines the interior cylindrical surface of the cup 16. Said bibulous material may be composed of porous blotting paper or other suitable liquid absorbing material. Resting upon bottom layer 22 and within cylindrical layer 23 is a cylindrical core 24 of a suitable depolarizing material, which may be composed of intimately mixed, finely powdered manganese dioxide and carbon or graphite and which may have mixed therein solid electrolyte salts, such as ammonium chloride and zinc chloride. A central rod-shaped carbon cathode 25 is embedded in the depolarizing core 24 and projects above the upper end of the latter. A metal cap 26 is fitted over the upper end of the cathode 25 to form the cell terminal.

The bibulous layer 23 and the depolarizing core 24 stop short of the top of the zinc cup 16, and a washer 27 of non-conductive and electrolyte resisting material, such as paraffin-impregnated paper, is arranged within the zinc cup above the top of the depolarizing core 24 and bibulous layer 23. A layer of similar material 28 is arranged in the space within outer container 10 surrounding the cells and at substantially the same level as washer 27. A closure 29 for the container 10 is arranged upon the top surfaces of washers 27 and layer 28. Such closure may be composed of a fusible sealing composition and it may embed the upper ends of cathodes 25 and metal caps 26 and the top edges of the zinc cups 16 and the envelopes 19, as shown. Open ended vent tubes 30 pass through the washers 27 and the closure 29 and provide communication between the interiors of the cells and the atmosphere. In the same way, a vent tube 31 passes through layer 28 and closure 29 and provides communication between the central space 21 and the atmosphere. Upon the bottom of the container 10 and within central space 21 is arranged an ampoule rupturing member 33 having an upwardly projecting point 34, as shown in Fig. 1. Resting upon the projection 34 and within central space 21 is a frangible envelope, or ampoule 35, which may have walls composed of a readily breakable material such as thin glass, and which contains an activating liquid 37 for the cells 12, 13, 14 and 15. This liquid may be an aqueous solution of electrolyte salts, such as ammonium chloride and zinc chloride. As an alternative, the bibulous layer 23 may, prior to the assembly of the cell, be saturated with an aqueous solution of electrolyte salts, and the water of the solution evaporated away, to leave the layer 23 impregnated with the electrolyte salts. In this case, the activating liquid 37 in ampoule 35 may be ordinary water.

Also within central space 21 and arranged above and resting upon ampoule 35 is a second frangible envelope, or ampoule 36, containing a non-conductive liquid 38 which is substantially immiscible with and has a higher specific gravity than the activating liquid 37 in ampoule 35. Examples of a suitable non-conductive liquid for the purpose are carbon tetrachloride, chloroform, ethyl iodide, normal propyl iodide, isopropyl iodide, normal butyl iodide, and tribromoethane.

The cells of the battery are connected in series by means of metallic conductors 42 which connect the zinc electrode of one cell to the carbon electrode of the next cell, as shown in Fig. 2. A conductor 43 connects the zinc electrode of cell 13 to battery terminal 45 and a second conductor 44 connects the carbon electrode of cell 12 to battery terminal 46. The conductors and terminals are embedded in the closure 29 and the terminals are adapted to be connected to an external circuit.

The battery, in the form described, may be stored indefinitely without suffering any appreciable deterioration. When it is desired to place the battery in use, the container 10 is moved sharply downwardly until the bottom strikes a stationary surface. The force of the blow causes the projection 34 to penetrate the frangible envelope 35, whereby the said envelope is broken and the activating liquid 37 is released and spreads into the lower portion of the container. At the same time, envelope 36 descends and comes to rest upon ampoule rupturing member 33. The activating liquid 37 passes through the spaces 20 underneath the envelopes 19 and spreads underneath the cells throughout the bottom of the container. It then wells up through the opening 17 in the bottom of the cell 12 and the similar openings in the remainder of the cells. It is immediately absorbed by the bibulous bottom layer 22 and spreads throughout this layer to the bibulous cylindrical layer 23, whereupon it is absorbed by and spreads throughout the latter layer. The two layers 22 and 23 become saturated with the activating liquid and the space occupied by these layers constitutes the electrolyte space of the cell. The liquid is also absorbed by the depolarizing core 24, moistening the latter and rendering it conductive. The air which is displaced from the layers 22 and 23 is expelled through the vent tube 30 to the atmosphere and air from the atmosphere enters space 21 through vent tube 31 to replace the space previously occupied by envelope 35. The activating liquid comes to rest at a level indicated by the dotted line 47 shown in Fig. 1.

The time required for the spread of the activating liquid throughout the electrolyte space is usually a matter of less than a minute. Thereafter, the container 10 is again moved downwardly with the hand and its bottom jarred against a stationary surface, whereupon the projection 34 penetrates the frangible envelope 36 and causes the latter to become broken. The non-conductive liquid 38 contained in the ampoule 36 then spreads throughout the bottom of the container 10. It displaces any activating liquid which remains upon the bottom of the container 10, such activating liquid rising to the surface of the non-conductive liquid. Within bibulous layers 22 and 23 there is no such displacement. Once the activating liquid has been absorbed by these layers, it is not displaced by the non-conductive liquid. By providing sufficient non-conductive liquid to fill the spaces 20 between the envelopes 19 and the bottom of the container 10, the zinc electrodes 16 of the individual cells are electrically isolated from each other. The final level of the non-conductive liquid is indicated by dotted line 47 in Fig. 1 and the level of the activating liquid by dotted line 48. The container 10 and the envelopes 19 are resistant to the non-conductive liquid.

The external circuit may be connected to the terminals 45 and 46 either before or after the activation of the battery. The non-conductive liquid 38 prevents the wasteful dissipation of the battery's energy which would otherwise occur due to short circuit current flowing between the cells through the electrolyte in space 21.

The modification illustrated in Figs. 3, 4 and 5 comprises a container 60 of non-conductive and electrolyte resisting material, which is rectangular in shape and has an open top. A plurality of plate-form cell elements are arranged in juxtaposed relationship from one end to the other of the container 60. The corresponding elements of the several cells will be designated by the same numerals. A layer of non-conductive and electrolyte resisting material 61 is arranged against the interior surface of the left hand end of the container, as the battery is viewed in Fig. 3. A zinc plate 62 is arranged adjacent to the non-conductive layer 61 and constitutes the anode of the first cell of the battery. A layer of bibulous non-conductive material 63 is arranged adjacent to the zinc anode, and may be composed of a suitable liquid absorbing material, such as blotting paper. Adjacent to the bibulous layer 63 is a relatively thick layer or cake of depolarizing material 64 which may be a mixture of finely divided manganese dioxide and carbon or graphite, and which may contain granules of electrolyte salts such as zinc chloride or ammonium chloride. Adjacent to the layer of depolarizing material 64 is a cathode 65 which may be a plate of carbonaceous material. Adjacent to the cathode 65 is the zinc anode 62 of the second cell. In usual practice, the carbonaceous material of the cathode 65 is coated upon the zinc anode 62 before the two are inserted in the battery container, the two plates being thereby electrically connected together, such electrical connection serving to connect the cells of the battery in series. The cell elements of the succeeding cells are arranged in succession in the same order as has been described, forming within the container 60 a plurality of cells, 67, 68, 69, 70, 71 and 72. The cathode 65 of the cell 72 is joined to a zinc plate 73 and on the opposite side of said plate 73 and arranged against the interior surface of the right hand end wall of the container 60 is a plate of non-conductive material 74.

The layer 64 of depolarizing mixture is of smaller dimensions than are the remainder of the elements of the cell, as is shown, resulting in the other elements extending laterally beyond the borders of the depolarizing cake. The anodes, cathodes, and bibulous layers extend downwardly into proximity with the bottom of the container 60 and are spaced from said bottom by means of supporting members 75 which are in the form of upwardly extending discontinuous ridges in the bottom of the container. Strips of non-conductive and electrolyte resisting material 76 extend between the bibulous layers 63 and the cathodes 65 and are spaced from the edges of the depolarizing cakes 64 along the top and the two sides of the battery, as shown, to form expansion spaces 77 around the peripheries of said depolarizing cakes. The whole is held in position by means of a fusible sealing material 78 which is poured between the side walls of the container 60 on one side and the strips 76 and the edges of the cell elements on the other side, and also over the tops of the cell elements and the strips 76 in the upper portion of the container to fill the container substantially to the top edges thereof.

A compartment 80 is provided in the mid-portion of the container 60, said compartment being adapted to hold two frangible envelopes 81 and 82, containing an activating liquid and a non-conductive liquid respectively, similar to the liquids described heretofore. The compartment is constructed by providing two spaced-apart partitions 83 and 84 of non-conductive and electrolyte resisting material, which partitions are held apart by means of a strip of non-conductive material 85 which extends along the top and the two sides of the compartment 80. The sealing material 78 is flowed down between the sides of the container 60 and the vertical portions of strip 85 and over the top of the horizontal portion of strip 85 and serves to fix the parts in position. A vent tube 89 is provided for each cell and a vent tube 90 is provided for the central compartment 80, such tubes passing through the strips 76 and the sealing material 78 and providing communication between the interiors of the cells and compartment 80 and the atmosphere.

The cathode 65 of cell 69 is conductively connected to the anode 62 of cell 70 by the metallic conductor 91. In order to make a satisfactory connection between the said cathode 65 and conductor 91, the cathode is joined to a zinc plate 88 in the same way as the cathode of each cell is joined to the anode of the adjacent cell, and the plate 88 is conductively connected to the conductor 91.

A conductor 93 is electrically connected at one end to the zinc anode 62 of the first cell 67 and at the other end to a terminal 94 which is embedded in the sealing material 78 and adapted to form one of the terminals of the battery. The cathode 65 of the last cell 72 is electrically connected to the zinc plate 73 in the same manner as described heretofore, and the zinc plate is connected to one end of a conductor 95, the opposite end of which is connected to the second terminal 96 of the battery which is embedded in the sealing material 78.

Means are provided for selectively rupturing the frangible envelopes 81 and 82, such means comprising plungers, one of which is plunger 100 which extends through openings in the fusible seal 78 and the non-conductive strip 85 and has its lower end arranged in adjacent relationship to the top of the frangible envelope 81 containing the activating liquid. The plunger 100 comprises a shank 101 which has an enlargement 102 at the lower end thereof which cooperates with the strip 85 to form a stop against the upward movement of the plunger. The shank 101 extends upwardly from the upper surface of the sealing material 78 and has a knob 103 at the upper end thereof, spaced from the sealing material 78. A helical spring member 104 surrounds the shank 101 and is compressed between the sealing material 78 and the knob 103. A frangible envelope breaking member 105 having an upwardly directed pointed projection 106 is arranged upon the bottom of the compartment 80. The frangible envelope 81 rests upon the projection 106. When it is desired to rupture the frangible envelope, the plunger 100 is pressed downwardly by the hand, whereby the walls of the envelope are fractured and the contents are released. A second plunger (not shown) is arranged above the frangible envelope 82 in the same manner as plunger 100 is arranged above envelope 81.

In activating the battery, the plunger 100 is depressed, rupturing envelope 81 and releasing the activating liquid. The latter will spread over the bottom of the container 60 and will come in contact with the bibulous layers 63 of the various cells. The activating liquid will be absorbed readily and will saturate the bibulous layers and also moisten the depolarizing cakes 64. After a suitable length of time has elapsed to permit the bibulous layers to become saturated, the second plunger is depressed, rupturing the frangible envelope 82 and releasing the non-conductive liquid. The latter spreads upon the bottom of the container 60 and, being of greater specific gravity, displaces the activating liquid, which rises to the top of the non-conductive liquid. Sufficient of the non-conductive liquid is provided to fill the container to a level somewhat above the lower edges of the electrodes of the battery. The electrodes of the different cells are thereby electrically isolated from one another except for the electrodes which are in immediate electrical contact with each other, such as the cathode 65 of cell 67 and the anode 62 of cell 68.

In the modification illustrated in Figs. 6 and 7, the non-conductive liquid has a specific gravity less than that of the activating liquid and forms a non-conductive layer upon the top of the activating liquid and thereby serves to prevent short circuits between the cells. The battery comprises a container 110 of non-conductive material. A partition of non-conductive material 111 extends across the interior of the container from the bottom thereof part-way toward the top and forms a compartment 112 in the end portion of the container within which a frangible envelope 113 is contained. The frangible envelope 113 is filled with activating liquid 114 which may be a liquid electrolyte of the same composition as described heretofore in connection with the other modifications.

Similarly, a partition 115 extends across the container 110 adjacent to the opposite end thereof and forms a compartment 116 within which is contained a frangible envelope 117 containing the non-conductive liquid 118. The liquid may be any non-conductive liquid which is substantially immiscible with the activating liquid and has a specific gravity less than that of the activating liquid. Examples of suitable liquids are gasoline, kerosene, benzol, toluene, and other hydrocarbons, amyl alcohol, amyl acetate, or the like.

Between partitions 111 and 115 is arranged a series of flat cell elements similar to those of the battery of Figs. 3, 4 and 5. A zinc element 119 is arranged immediately adjacent to partition 111 and extends upwardly from the bottom of the container to a height substantially equal to that of partition 111. A layer of bibulous non-conductive material 120 is arranged adjacent to the zinc element 119, a relatively thick layer of depolarizing material 121 is arranged adjacent to the bibulous layer 120, and a layer of carbon 122 is arranged adjacent to the depolarizing layer 121. A second zinc element 119 is arranged adjacent to the carbon element 122 and the series of elements continues in the manner described to form a series-connected, multiple-cell battery. The carbon element 122 of the last cell is in contact with a zinc element 124, and the battery terminal conductors 125 and 126 are connected to the first zinc element 119 and the last zinc element 124, respectively.

The layers of depolarizing material 121 are of smaller width and height than the other elements, and strips of electrical insulating and electrolyte resisting material 127 extend along the sides and bottom of the depolarizing layers and spaced a short distance therefrom. The strips 127 are held in position by engaging at their edges the bibulous layers 120 and the carbon layers 122 respectively. The strips 127 extend upwardly to substantially the same height as do the zinc elements 119, and a fusible sealing material 128 fills the space between the edges of the cell elements and the strips 127 on one side and the side walls and the bottom of the container on the other to form a liquid-tight seal for the activating liquid.

A sheet of electrical insulating material 130 closes the open top of container 110 near the upper edges thereof, and a fusible sealing material 131 is arranged upon the top of sheet 130. Battery terminals 132 and 133 are embedded in the fusible sealing material 131 and are connected to terminal conductors 125 and 126 respectively. Frangible envelope-breaking plungers 134 and 135 are mounted in the seal closure for the battery in the same manner as described in connection with the battery of Figs. 3, 4 and 5. Pointed frangible envelope-breaking members 136 and 137 are arranged in the bottom of compartments 112 and 116 respectively and are adapted to cause the rupture of frangible envelopes 113 and 117 upon the depressing of plungers 134 and 135 respectively.

When it is desired to activate the battery, plunger 134 is first depressed, causing the rupture of frangible envelope 113 and the release of the activating liquid 114 contained therein. Such liquid is present in a quantity sufficient to fill the container 110 to a level slightly above the top edges of the zinc elements 119, as indicated by the dotted line 140.

Thereafter, the envelope 117 is ruptured by depressing plunger 135, and the non-conductive liquid 118 is released and rises to the top of the activating liquid and floats upon the surface of the latter. The activating liquid fills the space previously occupied by the frangible envelope 117 and its level drops to that indicated by the dotted line 141, while the non-conductive liquid forms a layer above the activating liquid and occupying the space between dotted lines 141 and 142. The non-conductive liquid, being immiscible with the activating liquid, displaces the latter from the upper edges of the zinc electrodes 119 and the carbon electrodes 122 which are in contact with each other, and thereby prevents local action from occurring upon the edges of the zinc electrode. In addition, it prevents short-circuits between the different cells of the battery through the activating liquid.

Various modifications may be employed in addition to those which have been illustrated and described. For example, the ampoule containing the non-conductive liquid may be composed of a material which is soluble in the activating liquid, such as gelatine. In such a construction, it is necessary only to cause breaking of the ampoule containing the activating liquid. Thereafter, the material of the other ampoule will dissolve and the non-conductive liquid will be released. The walls of the second ampoule may be made of proper thickness such that the liquid will be released after a suitable interval following the release of the activating liquid.

As an alternative, the activating liquid and the non-conductive liquid need not be contained initially within the battery container. They may be introduced when it is desired to activate the battery. This may be accomplished in the battery of Figs. 1 and 2 by omitting the ampoules 35 and 36 and providing a tube in place of vent tube 31 which is large enough for the introduction of the liquids, and making similar provision in the other modifications. The liquids may be introduced in the proper sequence through the tube, when the action will be as described heretofore.

As a further alternative, one of the liquids may be contained in a frangible envelope within the battery container and the other liquid may be poured into the battery container as described above, the operations being carried out in the proper sequence as described heretofore.

The electrodes and the electrolyte of the cells may be different from those described heretofore. For example, the anode may be of a metal other than zinc, such as magnesium, aluminum, calcium, etc. and the depolarizer may be other than manganese dioxide, such as copper oxide, lead oxide, silver chloride, silver bromide, etc. and the cathode may be other than carbon, for example, copper, gold, platinum or silver. A type of cell with which the invention may be used is that employing a magnesium anode, a silver cathode, and a depolarizer composed of silver chloride or silver bromide.

Other modifications are included within the scope of the invention, as the latter is set forth in the appended claims.

I claim:

1. A deferred action battery, comprising a container having a bottom wall, a plurality of serially connected cells in said container, said cells being arranged to leave a space within said container, electrically non-conductive walls within said container separating said cells from one another and from said space, said walls being arranged to provide openings therein adjacent the bottom of said container, a rupturable envelope containing a cell activating liquid in said space, and a second rupturable envelope in said space and resting atop said first envelope, said second envelope containing a non-conductive liquid substantially immiscible with and of greater specific gravity than said activating liquid, and pointed means in said container opposed to the bottom of said first envelope, the amount of liquid in said second envelope being sufficient to cover said openings in said walls when released from said second envelope.

2. A deferred action battery, comprising a container, a plurality of serially connected cells in said container, electrically non-conductive wall means between said cells, said wall means being arranged to provide openings therethrough adjacent to the bottom of said container whereby said cells are in communication with each other, two rupturable envelopes in said container, the first of said envelopes containing a cell activating liquid and the second envelope containing a non-conductive liquid substantially immiscible with said activating liquid and having a specific gravity greater than that of said activating liquid, and means for selectively rupturing said envelopes, the amount of liquid in said second envelope being sufficient, when released, to cover said openings in said wall means.

3. A deferred action battery, comprising a container, a plurality of serially connected cells in said container, electrically non-conductive wall means between said cells, said wall means being arranged to provide openings therethrough adjacent to the bottom of said container whereby said cells are in communication with each other, a cell activating liquid and a non-conductive liquid substantially immiscible with said activating liquid and having a specific gravity greater from that of said activating liquid, means for separately confining said activating liquid and said non-conductive liquid within said container, and means for selectively releasing said activating liquid and said non-conductive liquid from said confining means into said container, the amount of said non-conductive liquid being sufficient, when released from said confining means, to cover said openings through said wall means.

4. A deferred action battery, comprising a container, a plurality of serially connected cells in said container, electrically non-conductive wall means between said cells, said wall means being arranged to provide openings therethrough adjacent to the bottom of said container whereby said cells are in communication with each other, a cell activating liquid and a non-conductive liquid substantially immiscible with said activating liquid and having a specific gravity greater than that of said activating liquid, means for separately confining said activating liquid and said non-conductive liquid within said container, and means for selectively releasing said activating liquid and said non-conductive liquid from said confining means into said container.

5. A deferred action battery, comprising a container, a plurality of electrically connected cells in said container, said cells being arranged to leave at least one space within said container, electrically non-conductive wall means separating said cells from each other and from said space and leaving a portion of each of said cells in communication with said space, said cells each having an opening therein in communication with said space, a cell activating liquid and a non-conductive liquid substantially immiscible with said activating liquid and having a specific gravity different from that of said activating liquid, means for separately confining said activating liquid and said non-conductive liquid within said space, and means for selectively releasing said activating liquid and said non-conductive liquid from said confining means.

6. A deferred action battery, comprising a container, a plurality of serially connected cells in said container, electrically non-conductive wall means separating said cells from each other, a plurality of envelopes in said container, means providing communication adjacent to the bottom of said container between the space occupied by said envelopes and the interiors of said cells, one of said envelopes containing an aqueous activating liquid for said cells and another of said envelopes containing a non-conductive liquid substantially immiscible with said activating liquid and having a specific gravity greater than that of said activating liquid, and means for selectively releasing said liquids from said envelopes.

7. A deferred action battery, comprising a container, a plurality of serially connected cells in said container, said cells being in communication with each other at portions thereof in such manner that liquid in said container and outside of said cells may enter said cells, a cell activating liquid and a non-conductive liquid substantially immiscible with said activating liquid and having a specific gravity different from that of said acitvaitng liquid, means for separately confining said activating liquid and said non-conductive liquid within said container and outside of said cells, and means for selectively releasing said activating liquid and said non-conductive liquid from said confining means into said container.

8. A deferred action battery, comprising a container, a plurality of serially connected cells in said container, said cells being in communication with each other at portions thereof and portions of the electrodes of said cells being exposed to each other in such manner that liquid in said container and outside of said cells is free to make contact with said exposed portions of said electrodes and to enter said cells, a cell activating liquid and a non-conductive liquid substantially immiscible with said activating liquid and having a specific gravity different from that of said activating liquid, means for separately confining said activating liquid and said non-conductive liquid within said container and outside of said cells, and means for selectively releasing said activating liquid and said non-conductive liquid from said confining means into said container, the amount of non-conductive liquid being sufficient, when released from said confining means, to provide insulation between said exposed portions of said electrodes and occupy at least a section of the path of communication between said cells.

9. A battery, comprising a container, a plurality of serially connected cells in said container, said cells having electrolyte spaces, a bibulous non-conductive material in said electrolyte spaces, channel means providing communication between said electrolyte spaces and a common space in said container, a cell activating liquid in said electrolyte spaces and said common space and absorbed by said bibulous material, and a non-conductive liquid in said common space and occupying said channel means between said common space and said electrolyte spaces, said activating liquid and said non-conductive liquid occupying different portions of said common space, said non-conductive liquid being immiscible with said activating liquid and having a specific gravity different from that of said activating liquid.

LAWRENCE H. HARRISS.

REFERENCES CITED

The following references are of record in the file of this patent:

UNITED STATES PATENTS

| Number | Name | Date |
|---|---|---|
| 279,839 | Starr | June 19, 1883 |
| 1,583,648 | Benner | May 4, 1926 |
| 1,807,595 | Kershaw | June 2, 1931 |
| 1,830,234 | Martus et al. | Nov. 3, 1931 |
| 2,147,116 | Winckler | Feb. 14, 1939 |
| 2,177,235 | Winckler | Oct. 24, 1939 |

FOREIGN PATENTS

| Number | Country | Date |
|---|---|---|
| 394,124 | Great Britain | June 22, 1933 |
| 211,714 | Great Britain | Feb. 28, 1924 |
| 433,999 | Germany | Sept. 13, 1926 |

OTHER REFERENCES

Pirani et al., Zeitschrift fur Metallkunde, April 1924, page 132.